(12) United States Patent
Ravid

(10) Patent No.: US 8,793,795 B1
(45) Date of Patent: Jul. 29, 2014

(54) COMPUTER FORENSIC TOOL

(75) Inventor: Gonen Ravid, Chatsworth, CA (US)

(73) Assignee: Intelligent Computer Solutions, Inc., Chatsworth, CA (US)

( * ) Notice: Subject to any disclaimer, the term of this patent is extended or adjusted under 35 U.S.C. 154(b) by 1387 days.

(21) Appl. No.: 11/327,205

(22) Filed: Jan. 6, 2006

Related U.S. Application Data

(60) Provisional application No. 60/648,314, filed on Jan. 28, 2005.

(51) Int. Cl.
*G06F 21/00* (2013.01)
*G06F 21/56* (2013.01)
*G06F 21/55* (2013.01)

(52) U.S. Cl.
CPC .............. *G06F 21/567* (2013.01); *G06F 21/55* (2013.01)
USPC ........................................................ 726/24

(58) Field of Classification Search
CPC .... G06F 21/50–21/577; H04L 63/12–63/1466
USPC ...................................... 726/21–36; 713/188
See application file for complete search history.

(56) References Cited

U.S. PATENT DOCUMENTS

| | | | |
|---|---|---|---|
| 6,222,840 B1 * | 4/2001 | Walker et al. ................. | 370/389 |
| 6,757,783 B2 | 6/2004 | Koh | |
| 6,785,091 B2 | 8/2004 | Edwards | |
| 6,792,545 B2 * | 9/2004 | McCreight et al. ............. | 726/29 |
| 6,829,672 B1 | 12/2004 | Deng | |
| 6,970,954 B1 * | 11/2005 | Guy et al. ........................ | 710/16 |
| 7,150,042 B2 * | 12/2006 | Wolff et al. ..................... | 726/22 |
| 7,152,242 B2 * | 12/2006 | Douglas .......................... | 726/23 |
| 7,308,322 B1 * | 12/2007 | Discenzo et al. ............... | 700/28 |
| 7,496,959 B2 * | 2/2009 | Adelstein et al. ............... | 726/21 |
| 7,584,345 B2 * | 9/2009 | Doering et al. ............... | 712/227 |
| 2002/0174190 A1 | 11/2002 | Toyoshima | |
| 2003/0005246 A1 | 1/2003 | Peinado | |
| 2003/0115415 A1 | 6/2003 | Want | |
| 2003/0212862 A1 | 11/2003 | James | |
| 2004/0010671 A1 | 1/2004 | Sampsa | |
| 2004/0017807 A1 * | 1/2004 | Dorr et al. ..................... | 370/389 |
| 2004/0039876 A1 | 2/2004 | Nelson | |

(Continued)

OTHER PUBLICATIONS

FPGA, Jul. 11, 1997, Free On-Line Dictionary of Computing, http://foldoc.org/?FPGA.*

(Continued)

*Primary Examiner* — Gilberto Barron, Jr.
*Assistant Examiner* — David Le
(74) *Attorney, Agent, or Firm* — Christie, Parker & Hale, LLP

(57) ABSTRACT

A computer forensic accelerator engine designed to speed up the forensic analysis process is disclosed. It is a device for use with an analysis device to analyze data on a suspect computer device, and includes a first interface for connecting to the suspect computer device, a second interface for connecting to the analysis device, and a processing unit programmed to read data from the suspect device via the first interface, perform analysis on the data, transmit the data to the analysis device via the second interface, and transmit results of the analysis to the analysis device via the second interface. A drive write protect module may be integrated in the computer forensic accelerator engine. The computer forensic accelerator engine allows data read from the suspect drive to be analyzed while acquiring the data. Also disclosed is a computer forensic analysis system and method using the computer forensic accelerator engine.

40 Claims, 9 Drawing Sheets

Details of the APD

(56) References Cited

U.S. PATENT DOCUMENTS

2004/0158732 A1\*  8/2004  Kissel ........................... 713/200
2004/0236899 A1   11/2004  Teicher
2005/0149745 A1\*  7/2005  Ishidoshiro ................... 713/189
2008/0243955 A1\* 10/2008  Anderson et al. ............. 707/204

OTHER PUBLICATIONS

Forensic: Computer Analysis: AN Introduction, Sep. 1, 2000, Dr. Dobbs Portal, http://www.ddj.com/184404242.\*

\* cited by examiner

COMPUTER FORENSIC TOOL

CROSS-REFERENCE TO RELATED APPLICATION

This application claims priority to and the benefit of U.S. Provisional Application No. 60/648,314, filed on Jan. 28, 2005.

BACKGROUND OF THE INVENTION

1. Field of the Invention

This invention relates to computer technologies, in particular, to one for forensic analysis of computer stored information.

2. Description of the Prior Art

Legal and other investigative operations today often involve forensic analysis of computer stored data. In a typical forensic search operation, after obtaining a necessary court order or other authorizations for searching and seizing a suspect's computer evidence, the suspect computer may be seized and transported to a forensic laboratory, and data from the computer is acquired for analysis. Alternatively, an investigator may visit the suspect's place of illegal operation, acquire data from the suspect computer in the field through verifying an evidence drive or copying data from the suspect computer. And subsequently send the evidence drive or images containing copied data to a forensic laboratory for analysis.

A conventional data acquisition process is schematically illustrated in FIG. 1. Data acquisition equipment (computer or drive duplicator) 10 is used to copy data from the suspect drive or computer 12, which results in creation of an identical evidence image on a storage device (evidence drive 14). The image can be in several different formats. The simplest one is a sector by sector replica of the suspect media. The next one is of multiple files that contain all the sectors of the suspect media. The most advanced format breaks the subject image into blocks. Each block is then stored on the evidence drive and is compressed with its own hash value. All of the above mentioned formats particularly the most advanced one require significant data processing during the acquisition of the suspect media.

Some storage devices in a suspect computer may be accessed directly without powering up the suspect computer. Other storage devices (e.g. hard drives on some notebook computers) may not be accessed without powering up the suspect computer. In this situation, the investigator may use a special software to power up the suspect computer. The software typically boots the suspect computer without using the local operation system on the suspect computer to avoid any writes to the local suspect drive. When a storage device can be accessed directly, a write protect device 16 may be used in conjunction with the suspect's storage device to avoid any accidental write to the suspect drive due to human error or equipment malfunction.

Hashing the data for the purpose of authentication is currently done either by the hard drive duplicators or by the acquisition software if a computer is used for obtaining the image. The hard drive duplicators today, which are not controlled by analysis software, can only perform the hash on the entire drive.

The subsequent analysis of the evidence drive 14 acquired from the suspect computer is schematically illustrated in FIG. 2. Typically, a computer forensic expert examines the data on the evidence drive or image 14 using an analysis unit 18, traditionally a computer with analysis software, looking for any evidence of interest. Typically the forensic expert has some idea of what he is looking for and may use a variety of software analysis tools to look for a specific piece of information.

The analysis can be very tedious and time-consuming, and often requires highly skilled and experienced professionals. With the dramatic increase in the size of computer hard disc drives, often the amount of information to be analyzed is large while analysis resources are always limited. This results in a backlog of workload at computer forensic analysis agencies such as law enforcement agencies.

As an example to show the level of sophistication and how time consuming the analysis is, it is estimated that using the best analysis software on a fast computer, to confirm a suspicion that the suspect uses a computer to connect into child pornography sites, while the suspect only visits a few of the hundreds of known sites with a 40 GB hard disc drive computer, it will take an investigator about six (6) hours to perform the analysis.

For a comparison, it only takes about 30 minutes for presently invented computer forensic tool or computer forensic accelerator engine to complete the same assignment.

From above introduction, it is apparent that there is an urgent need for a computer forensic tool which can speed up forensic data analysis in order to accommodate the significant increase of data storage capability in recent computer technology.

The following eleven (11) prior art patents are relevant to the field of the present invention:

1. United States Patent Application Publication No. US2002/0174190 published on Nov. 21, 2002 (hereafter "the Toyoshima Publication");
2. United States Patent Application Publication No. US2003/0005246 published on Jan. 2, 2003 (hereafter "the Peinado Publication");
3. United States Patent Application Publication No. US2003/0115415 published on Jun. 19, 2003 (hereafter "the Want Publication");
4. United States Patent Application Publication No. US2003/0212862 published on Nov. 13, 2003 (hereafter "the James Publication");
5. United States Patent Application Publication No. US2004/0010671 published on Jan. 15, 2004 (hereafter "the Sampsa Publication");
6. United States Patent Application Publication No. US2004/0039876 published on Feb. 26, 2004 (hereafter "the Nelson Publication");
7. U.S. Pat. No. 6,757,783 issued on Jun. 29, 2004 (hereafter "the Koh Patent");
8. U.S. Pat. No. 6,785,091 issued on Jun. 29, 2004 (hereafter "the Edwards Patent");
9. United States Patent Application Publication No. US2004/0236899 published on Nov. 25, 2004 (hereafter "the Teicher Publication");
10. U.S. Pat. No. 6,829,672 issued on Dec. 7, 2004 (hereafter "the Deng Patent"); and
11. United States Patent Application Publication No. US2004/0250009 published on Dec. 9, 2004 (hereafter "the Chen Publication"). The Toyoshima Publication disclosed an apparatus and method for providing data to a mobile device, including inserting a wireless module into a host mobile device, transferring data about device type from the host mobile device to the wireless module, retrieving from a memory device by the wireless module, website addresses associated with the device type data, and accessing the website addresses retrieved using the host mobile device with the wireless module coupled therein.

The Peinado Publication disclosed a device for securely recording protected content to a portable memory, and for reading the protected content therefrom. The device includes a feature that makes it adapted to read or write specially-configured portable memories that are incompatible with standard rear/write devices.

The Want Application disclosed a method and device for communicating with an access device. The device includes a wireless communication module to communicate with the access device in a wireless fashion, a data storage module to store bulk data, and a controller connected to the communication module and to the data storage module. The device may function as a personal server which communicates with an access device using Bluetooth technology.

The James Publication disclosed a memory module that is releasably connected to a computer, which contains an application software package and associated data. When connected to the computer, the application software package runs directly from the device without being uploaded or installed on the computer.

The Sampsa Publication disclosed a method, a memory adaptor and a system for handling data in a fixed memory of a mobile device. It provides a non-volatile memory as a kind of cache memory for accessing mass storage, where the fixed memory includes a non-volatile memory and a mass storage.

The Nelson Publication disclosed a portable mass memory device with a self-contained housing. The device has a memory card receptacle for receiving a compact moveable memory card. The device also has a processor to enable transfer of data from a compact moveable memory card to the mass memory of the device.

The Koh Patent disclosed a portable storage medium based on Universal Serial Bus (USB) standard. It has a USB connector for connection to the USB port of a host computer, a non volatile memory for storing data transferred from the host computer, an operation program stored on the device, and a controller for controlling the entire operation of the device.

The Edwards Patent disclosed an interchangeable cartridge data storage system for exchanging digital data among a plurality of handheld devices. Digital signals are written by a first handheld device to a mini-cartridge which is inter-operable among the plurality of handheld devices, each of which is equipped with a mini-disk drive.

The Teicher Publication disclosed an integrated storage device for storing data received wirelessly from a remote base station. The device includes a non-volatile storage medium and a processor.

The Deng Patent disclosed an electronic flash memory external device for data processing systems. The device includes firmware for controlling the access of electronic storage media and implementing interfacing functions.

The Chen Publication disclosed a storage device with optimal compression management mechanism. It has a controller, a solid state storage medium, and memory interfaces. The device also has a data compression/decompression module for compression raw data before they are written to the storage medium in order to increase the data storage capacity of the storage medium.

SUMMARY OF THE INVENTION

The present invention provides apparatus and methods that obviate one or more disadvantages of the conventional art.

An object of the present invention is to provide a device and method that speeds up forensic analysis of computer stored information, and thereby speeds up the investigation.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

For achieving these and other advantages and in accordance with its purpose, as embodied and broadly described, the present invention provides a computer forensic tool or computer forensic accelerator engine to speed up analysis data on a suspect computer device. The engine, Analysis and Processing Device (APD) includes a first interface for connecting to the suspect computer or computer device, a second interface for connecting to the Analysis Unit, and a processing unit. The processing unit receives instructions from the Analysis Unit and are programmed to read data from the suspect device via the first interface, performs 24 processing and analysis on the data, transmits the data to the Analysis Unit via the second interface, and transmits results of the analysis to the analysis device via the second interface. The second interface could actually be either one port for transferring both data, analysis instructions and results (FIG. 3) or two separate ports (FIG. 3a), one for the data and one for analysis instructions and results. The processing unit plays a fundamental role in accelerating the analysis due to its unique dedicated hardware implementations.

In another aspect, the present invention provides a system for analyzing data on a suspect computer or computer device. The system including an Analysis Unit for analyzing data obtained from the suspect computer or computer device, and an APD (which is used as an hardware accelerator) connected to the first Analysis Unit. The APD includes an interface for connecting to the suspect computer device, and a processing unit programmed to read data from the suspect device via the interface, perform analysis on the data, transmit the data and the analysis results to the Analysis Unit In yet another aspect, the present invention provides a method for analyzing data on a suspect computer or computer device, including connecting an APD to the Analysis Unit and to the suspect computer or computer device, reading data from the suspect device into the APD, analyzing the data by the APD, transmitting the data from the APD to the Analysis Unit, and transmitting results of the analysis from the APD the Analysis Unit, wherein the steps of transmitting the data and transmitting the results of the analysis are performed substantially concurrently.

In an additional aspect of the present invention, the APD while analyzing and transferring the suspect device data, can also perform hashing such as MD5, SHA1 or SHA2, as pre-processing of the data that passes through it.

In another aspect of the present invention, the APD can perform compression on the data that passes through it.

It is a further aspect of the present invention to enable the analyzing and pre-processing device, the APD, to be used as a stand alone accelerator, not connected to the suspect/evidence device/computer, but only connected to the Analysis Unit. In this case, all functionality of the analyzing and processing device should be available as data processing accelerator to the Analysis Unit. Therefore, in this case the data to be analyzed is either already inside the Analysis Unit or the suspect/evidence drive/computer is connected directly to the analyzing system, the Analysis Unit.

It is a further aspect of the present invention to enable the analyzing and pre-processing device, the APD to be used as a stand alone accelerator, not connected to the suspect/evidence device/computer, but only connected to a network of analyzing units. In this case, all functionality of the analyzing and processing device should be available as a data processing accelerator to the network of analyzing units. Therefore, in this case the data to be analyzed is either already inside the network of analyzing units or the suspect/evidence drive/ computer is connected directly to the network of analyzing systems.

In further aspect, the present invention provides a computer forensic analysis network system to simultaneously analyze multiple suspect computers or computer storage devices. In one variation, multiple analyzing and pre-processing units, APD's, can be connected to a single analyzing unit, to allow for multiple pre-processing of drive/computer by a single investigator on a single system. In another variation, multiple analyzing and pre-processing units, APD's, can be connected to multiple analyzing units through a network, to allow for multiple pre-processing of drive/computer by multiple investigators.

It is to be understood that both the foregoing general description and the following detailed description are exemplary and explanatory and are intended to provide further explanation of the invention as claimed.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention generally relates to the field of computer data and file transfer and downloading technologies and more particularly is related to tools used in computer forensic analysis and investigation.

Embodiments of the present invention provide a computer forensic data processing accelerator engine designed to speed up the analysis process by performing processing of the information while acquiring data. This enables the analysis process to start concurrently with starting the data copying process. In case of applying the present invention to analyze multiple suspect computers or computer storage devices, investigators most likely will initiate the analysis on multiple suspect computers or computer storage devices and then acquire data from the analyzed computer or computer storage device connected to an accelerator engine that detects a suspicious information on that device. Such a configuration allows the investigator to simultaneously process multiple computers or storage devices.

The computer forensic accelerator engine may have a processing unit implemented with dedicated hardware and firmware programmed and optimized for specific search, and data hashing, compression and analysis algorithms optimized for computer forensic investigation, but can be used in general data processing. Using FPGA (field programmable gate arrays) and/or embedded microprocessor technologies, the hardware and firmware of the processing unit may be implemented in a singe chip or a small board.

Figure 2:
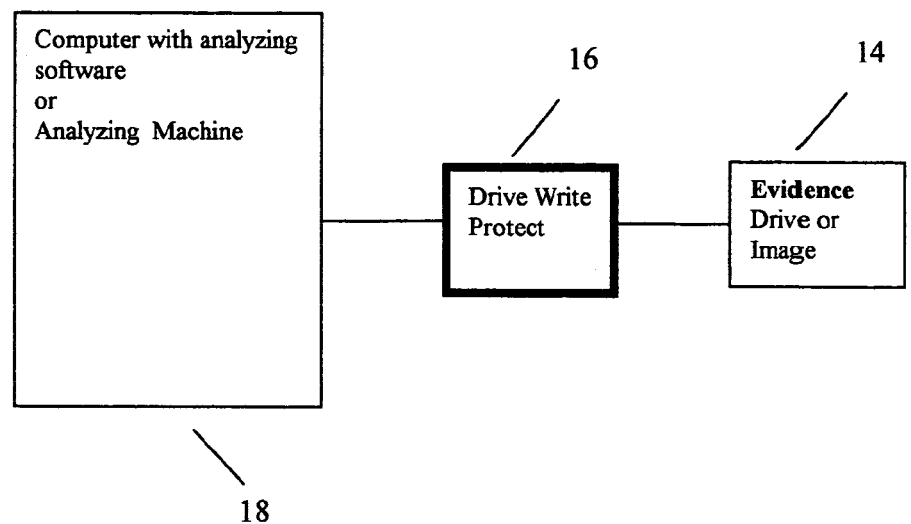
FIG. 2 schematically illustrates a conventional data analysis process in forensic investigation of computer information.
Figure 3:
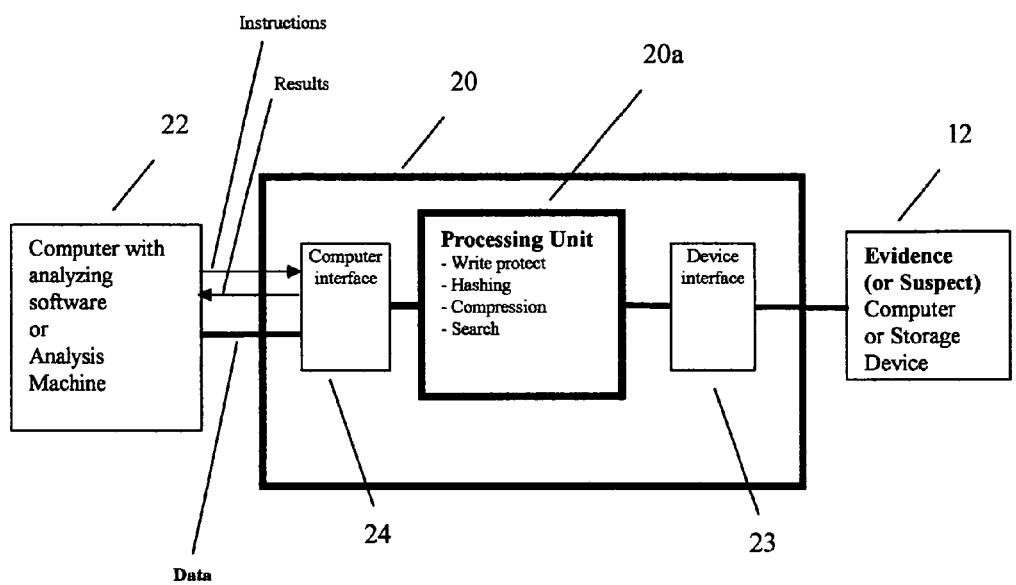
FIG. 3 schematically illustrates a computer forensic analysis method and tool according to an embodiment of the present invention, where the second interface has one port for transferring data, analysis instructions, and results.
Figure 3A:
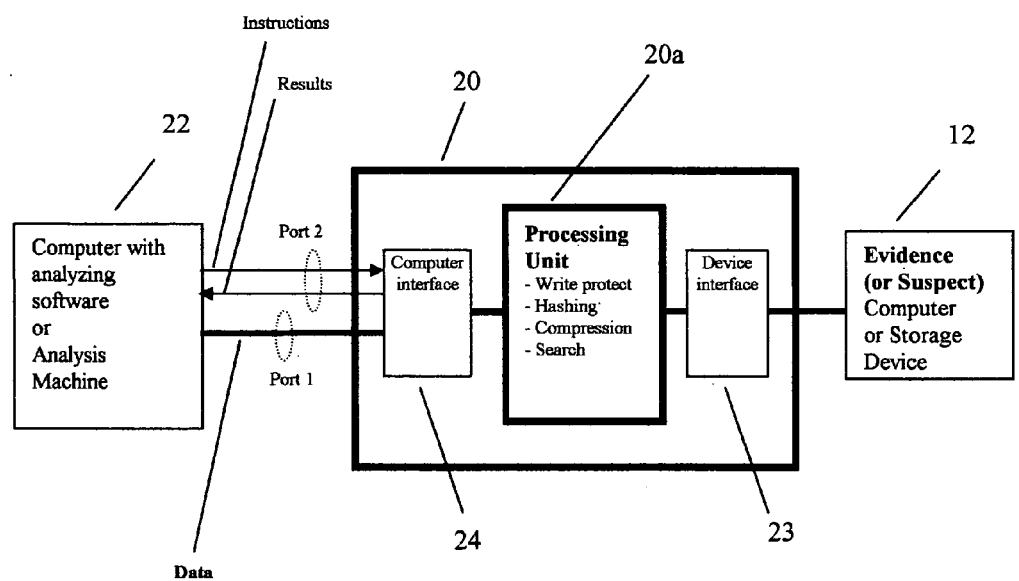
FIG. 3a schematically illustrates a computer forensic analysis method and tool according to an alternative embodiment of the present invention, where the second interface has two separate ports, a first port for transferring data and a second port for transferring analysis instructions and results.

As shown in FIG. 3, the computer forensic accelerator engine, APD 20 is located between the suspect storage device or computer 12 and an analysis device, Analysis Unit 22 (which may be a computer or dedicated electronic hardware with analysis software). The computer forensic accelerator engine 20 is provided with the first interface (23) to electronically communicate with the suspect device 12 and the second interface (24) to the analysis device 22. The forensic accelerator engine 20 containing the processing unit 20a performs search, processing (compression and hashing) and analysis based on predetermined algorithms on the data stream being copied from the suspect device 12, and reports analysis results with or without the copied data to the analysis device 22. The algorithms of search and analysis may be similar to the search and analysis algorithms implemented in the computer or analysis device 18 in a conventional system (see FIG. 2). In addition, a protocol in the computer forensic accelerator engine 20 may be provided to allow the analysis device 22 to communicate with the computer forensic accelerator engine 20 without affecting the suspect drive. The computer forensic accelerator engine 20 is provided with the ability to communicate with the analysis device 22 to receive various instructions including parameters (such as a list of website names) from the analysis device 22 prior to and during data acquisition and analysis. This allows the investigator using the analysis device 22 to optimize the search as desired. A data storage device may be connected to the analysis device 22 (or be a part of it) for storing the data read from the suspect device 12. The data storage device is not shown in FIG. 3, but it may be connected to the analysis device 22 in a similar fashion as the evidence drive 14 is connected to the computer or drive duplicator tool 10 shown in FIG. 1. In the embodiment illustrated in FIG. 3, the second interface 24 has one port for transferring data, analysis instructions and results. In the alternative embodiment illustrated in FIG. 3a, the second interface 24 has two ports, a first port for transferring data, and a second port for transferring analysis instructions and results.

Figure 4:
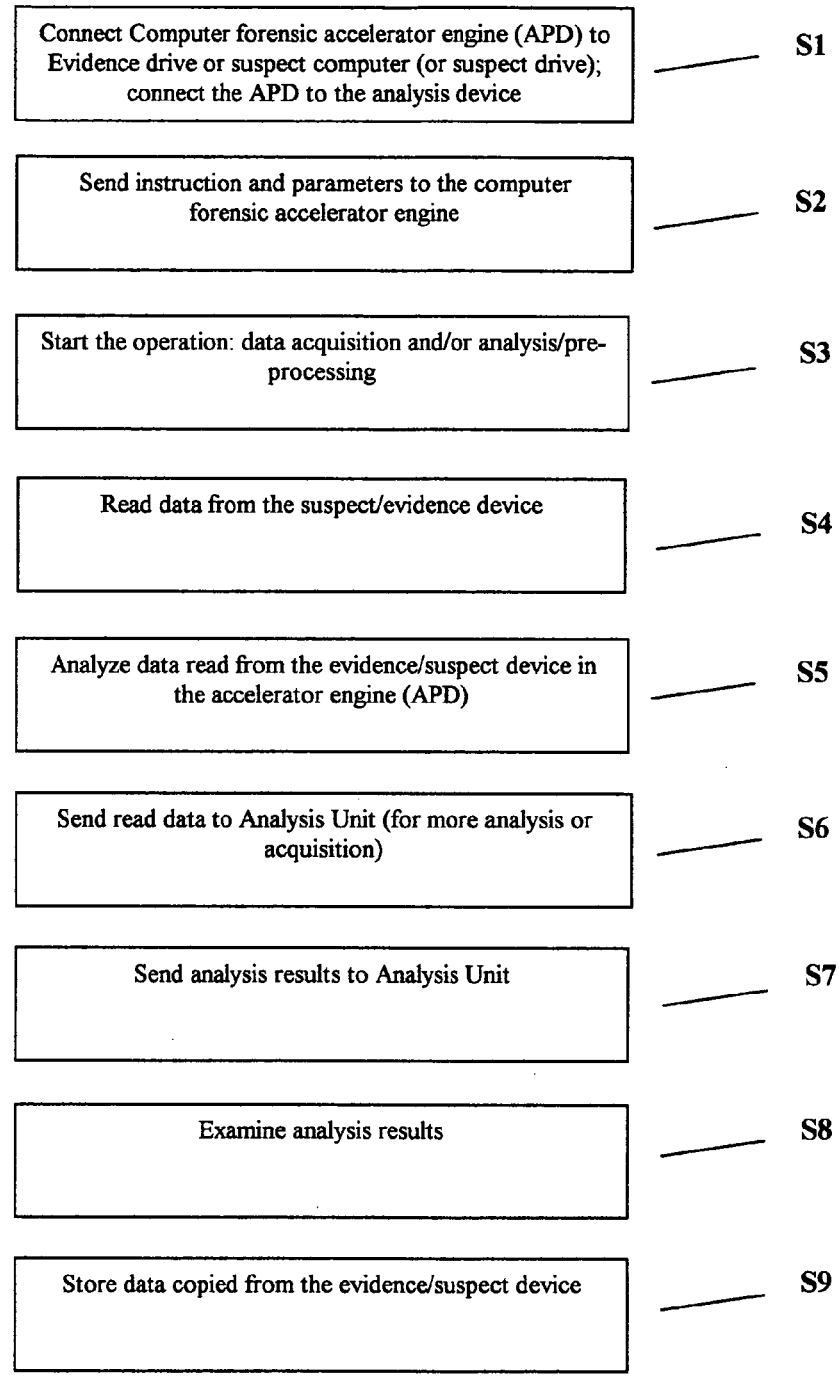
FIG. 4 illustrates processes of the forensic analysis using a computer forensic accelerator engine according to an embodiment of the present invention.

In operation (see FIG. 4), the investigator connects the computer forensic accelerator engine 20 to the suspect device 12 and to the analysis device 22 (Step S1 in FIG. 4). Programming the computer forensic accelerator, engine and/or sending parameters/instructions to it (Step S2). This may occur prior to the computer forensic operation (prior to arriving at the suspect's facility), or during the computer forensic operation. After the operation started (Step S3), data is read from the suspect device 12 (Step S4), and is analyzed in the computer forensic accelerator engine 20 (Step S5) before or while the data is sent to the analysis device 22 (Step S6). The analysis results are sent to the analysis device 22 (Step S7) substantially concurrently with the writing of data to the analysis device 22. In other words, the data may technically be sent to the analysis device before or after the analysis results are sent, or they may be sent in an interleaved manner, but from the forensic investigator's stand point, the obtaining of the analysis results from the computer forensic accelerator engine occurs substantially at the same time as the copying of data without appreciable delay. Thus, from the standpoint of the investigator, as soon as the data acquisition or analysis starts, analysis results are sent from the computer forensic accelerator engine 20 to the analysis device 22. The analysis results may be examined by the investigator using the Analysis Unit 22 (Step S8). The data from the evidence or suspect device 12 may be stored in the Analysis Unit 22 or a data storage device connected thereto (Step S9). If evidence of interest is present, the investigator is able to see it immediately and make appropriate adjustments to his investigation strategy. If, on the other hand, the analysis results from the computer forensic accelerator engine 20 indicate no presence of evidence of interest, the evidence or suspect computer or storage device may not need to be further analyzed. The steps illustrated in FIG. 4 are not necessarily performed in the particular order shown and some steps could be skipped.

Figure 1:
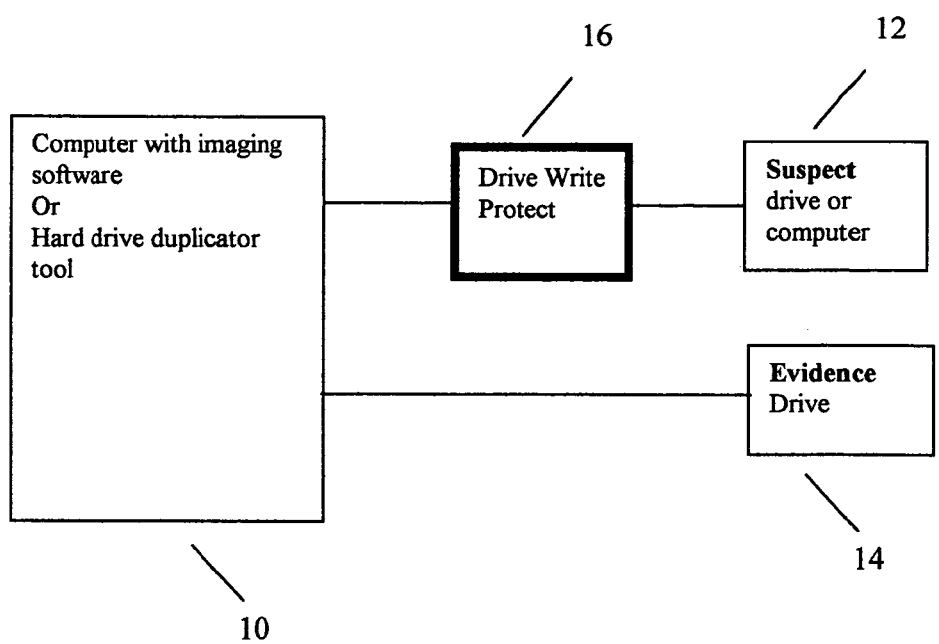
FIG. 1 schematically illustrates a conventional data acquisition process in forensic investigation of computer data.

In one embodiment, the computer forensic accelerator engine, APD, is incorporated into a write protect device which may be a part of a conventional data acquisition system such as the one shown in FIG. 1. In such a case, the engine 20 located between the suspect device 12 and the Analysis Unit 22 shown in FIG. 3 may contain the processing unit 20a that includes the functionalities of the computer forensic accelerator engine described herein, and other components (not shown) of a conventional write protect device. The hardware in the conventional write protect device 16 (FIG. 1) typically contains a large FPGA or microprocessor. In this embodiment, the forensic accelerator functionalities may be implanted as firmware executed by the existing hardware of the write protect device 16, or implemented as expanded hardware (e.g. a bigger FPGA) if necessary. In an alternative embodiment, the forensic accelerator engine 20 may be a dedicated piece of hardware and is not integrated with the conventional write protect device. In another alternative embodiment, the functionalities of the computer forensic accelerator engine 20 may be physically integrated with the Analysis Unit 22 in a single housing. For all above mentioned embodiments, the duplicator could be an addition to the Analysis Unit 22.

Figure 5:
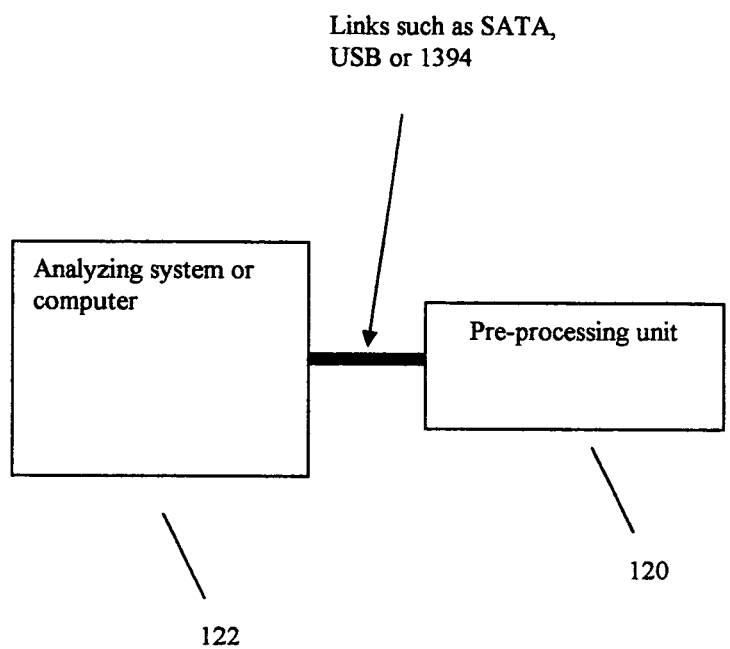
FIG. 5 schematically illustrates an analyzing pre-processing unit used as a stand alone accelerator and not connected to a suspect computer, but only connected to an analyzing unit.

Referring to FIG. 5, it is a further aspect of the present invention to enable the analyzing and pre-processing device, APD, 120 to be used as a stand alone accelerator, not connected to the suspect/evidence device or suspect computer, but only connected to the Analysis Unit 122. In this case, all functionality of the analyzing and processing device should be available as a data processing accelerator to the Analysis Unit 122. Therefore, in this case the data to be analyzed is either already inside the Analysis Unit or the suspect/evidence drive or suspect computer is connected directly to the analyzing system.

Figure 6:
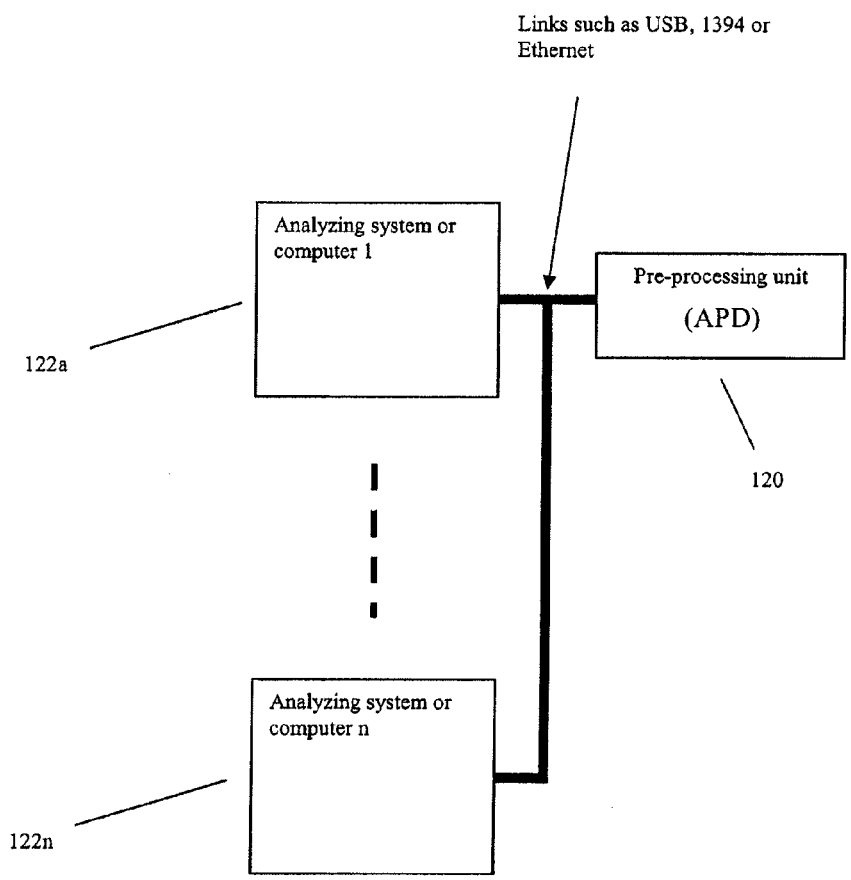
FIG. 6 schematically illustrates an analyzing pre-processing unit used a stand alone accelerator and not connected to a suspect computer, but only connected to a multiplicity of analyzing units through a network.

Referring to FIG. 6, it is a further aspect of the present invention to enable the analyzing and pre-processing device 120 to be used as a stand alone accelerator, not connected to the suspect/evidence device or suspect computer, but only connected to a network of analyzing units 122a through 122n. In this case, all functionality of the analyzing and processing device 120 should be available as a data processing accelerator to the network of analyzing units 122a through 122n. Therefore, in this case the data to be analyzed is either already inside the network of analyzing units or the suspect/evidence drive or suspect computer is connected directly to the network of analyzing systems.

In a situation when there is a need to simultaneously analyze multiple suspect drives or computers, the following two embodiments may be applied.

Figure 7:
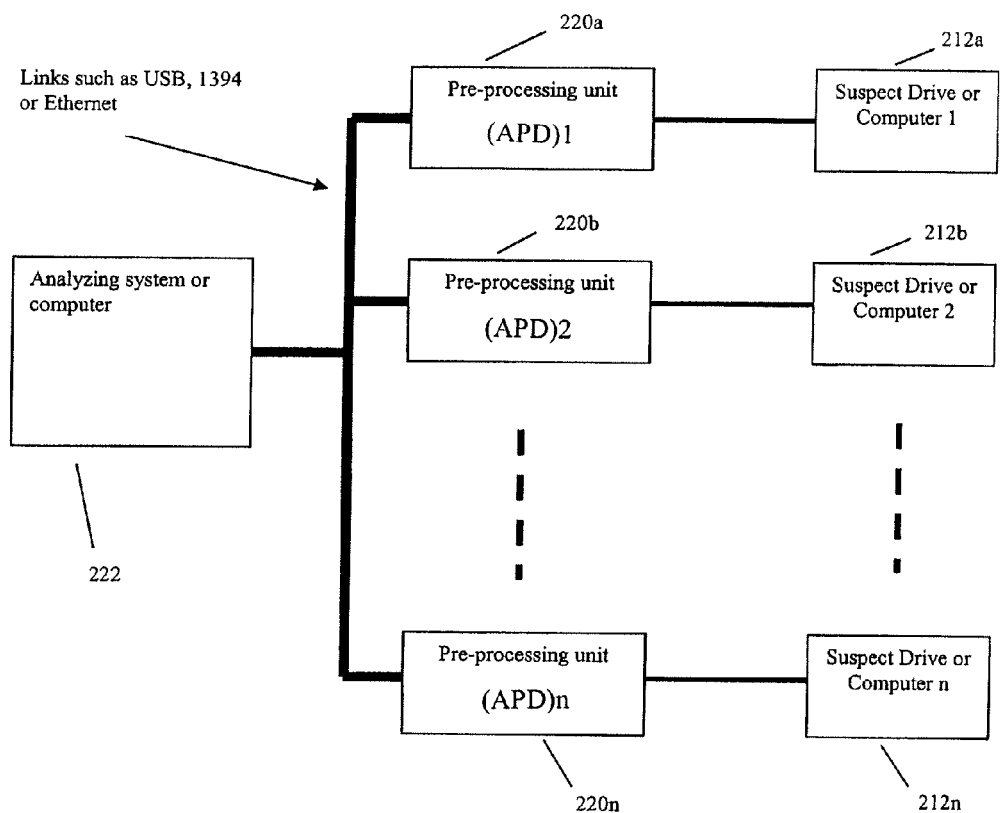
FIG. 7 schematically illustrates a computer forensic analysis network system for simultaneously analyzing multiple suspect computers with a single analysis device.

In the first embodiment as shown in FIG. 7, each of the multiple suspect/evidence drives or computers 212a through 212n are electronically linked to one of their respective computer forensic accelerator engines 220a through 220n. All the APD's are linked together to an Analysis Unit with a high speed data transfer mechanism 222, such as USB, 1394, or Ethernet. This shows that multiple analyzing pre-processing units can be connected to a single Analysis Unit, to allow for multiple pre-processing of drive/computer by a single investigator on a single system.

Figure 8:
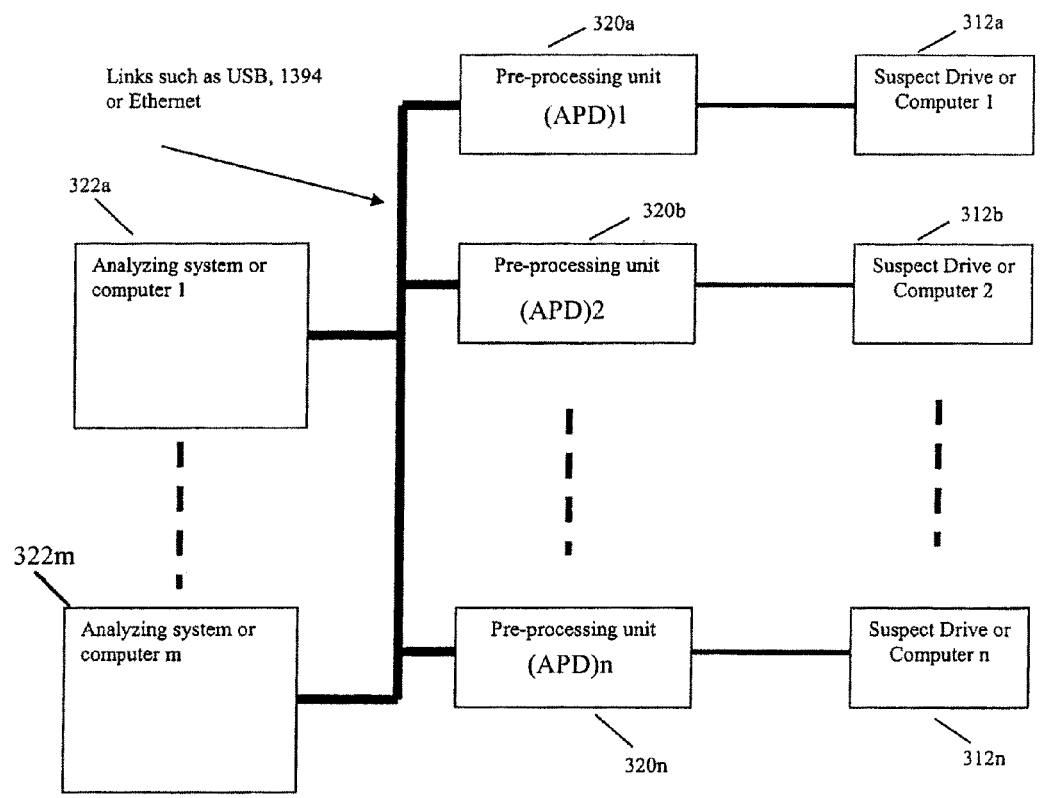
FIG. 8 schematically illustrates another computer forensic analysis network system for simultaneously analyzing multiple suspect computers with multiple analysis devices.

In the second embodiment, as shown in FIG. 8, each of the multiple suspect/evidence drives or computers 312a through 312n are electronically linked to one of their respective computer forensic accelerator engines 320a through 320n. All the APD's are linked together to a multiplicity of Analysis Units or computers with a high speed data transfer mechanism 322a through 322m, such as USB, 1394, or Ethernet. This shows that multiple analyzing pre-processing units can be connected to multiple analyzing units through a network, to allow for multiple preprocessing of drive/computer by multiple investigators.

Some advantages of the computer forensic accelerator engine according to embodiments of the present invention are as follows. Use of the computer forensic accelerator engine may eliminate the need to acquire the entire data stored in the seized computers. During data acquisition, the computer forensic accelerator engine may help identify suspect storage devices/computers that need to be analyzed further. It makes a duplicator device that conventionally does not have processing power into a low cost, efficient analysis tool. It can significantly reduce the cost of an analysis system. It helps to provide consistent and timely analysis results. It allows forensic analysis of computer data to be carried out by less experienced and less skilled professionals. It speeds up analysis significantly, and as a result, may help to significantly reduce the major problem of analysis backlog at the law enforcement or other agencies.

Defined broadly, the present invention is a device for use with an analysis unit to analyze data on a suspect computer or computer device, comprising: a first interface for connecting to the suspect computer or computer device; a second interface for connecting to the analysis unit; and a processing unit programmed to read data from the suspect device via the first interface, perform analysis on the data, transmit the data to the analysis device via the second interface, and transmit results of the analysis to the analysis device.

Defined in more detail, the present invention is a system for analyzing data on a suspect computer device, comprising: a first processing device for analyzing data obtained from the suspect computer device; and a second processing device connected to the first processing device, including: an interface for connecting to the suspect computer device, and a processing unit programmed to read data from the suspect device via the interface, perform analysis on the data, transmit the data to the first processing device, and transmit results of the analysis to the first processing device.

Defined alternatively, the present invention is a method for analyzing data on a suspect computer device, comprising: connecting a second processing device to a first processing device and to the suspect computer device; reading data from the suspect device into the second processing device; analyzing the data by the second processing device, transmitting the data from the second processing device to the first processing device; and transmitting results of the analysis from the second processing device to the first processing device; wherein the steps of transmitting the data and transmitting the results of the analysis are performed substantially concurrently.

Defined alternatively in more detail, the present invention is a method for analyzing data on a suspect computer device, comprising: connecting a computer forensic accelerator engine to an analysis device; connecting the computer forensic accelerator engine to the suspect computer device, programming the computer forensic accelerator engine or sending parameters and instructions to the computer forensic accelerator engine, reading data from the suspect device into the computer forensic accelerator engine, analyzing the data by the computer forensic accelerator engine; and transmitting the data from the computer forensic accelerator engine to the analysis device; and transmitting the results of the analysis from the computer forensic accelerator engine to the analysis device; wherein the steps of transmitting the data and transmitting the results of the analysis are performed substantially concurrently.

The present invention is also defined as a network system for analyzing data on a multiplicity of suspect computer devices, comprising: connecting a respective one of the multiplicity of suspect computer devices to a respective one of a multiplicity of engines for analyzing data obtained from a respective one of the multiplicity of suspect computer devices; connecting the multiplicity of engines together with a high speed data transfer mechanism; and connecting an analysis device to the high speed data transfer mechanism.

The present invention is further defined as a network system for analyzing data on a multiplicity of suspect computer devices, comprising: connecting a respective one of the multiplicity of suspect computer devices to a respective one of a multiplicity of engines for analyzing data obtained from a respective one of the multiplicity of suspect computer devices; connecting the multiplicity of engines together with a high speed data transfer mechanism; and connecting a multiplicity of analysis devices to the high speed data transfer mechanism.

The present invention is additionally defined as a device, comprising: using an analyzing pre-processing unit as a stand alone accelerator, not connected to a subject computer, but only connected to an analyzing unit; all functionality of the analyzing pre-processing unit is available as a hardware accelerator to the analyzing unit; and the data to be analyzed is either already inside the analyzing unit or the suspect computer is connected directly to the analyzing unit.

The present invention also includes a device, comprising: using an analyzing pre-processing unit as a stand alone accelerator, not connected to a subject computer, but only connected to a multiplicity of analyzing units through a network; all functionality of the analyzing pre-processing unit is available as a hardware accelerator to the multiplicity of analyzing units; and the data to be analyzed is either already inside the multiplicity of analyzing units or the suspect computer is connected directly to the multiplicity of analyzing units through a network.

Of course the present invention is not intended to be restricted to any particular form or arrangement, or any specific embodiment, or any specific use, disclosed herein, since the same may be modified in various particulars or relations without departing from the spirit or scope of the claimed invention herein. The above shown and described apparatus or method is intended only for illustration and disclosure of an operative embodiment and not to show all of the various forms or modifications in which this invention might be embodied or operated.

It will be apparent to those skilled in the art that various modification and variations can be made to the computer forensic tool described above without departing from the spirit or scope of the invention. Thus, it is intended that the present invention cover modifications and variations that come within the scope of the appended claims and their equivalents.

What is claimed is:

1. A hardware accelerator for use with an analysis unit to analyze data on an external suspect device comprising a suspect computer or computer device, the hardware accelerator comprising:
   a first interface for connecting to the external suspect device, the first interface being configured to transfer the data at a first data transfer rate, the first data transfer rate being limited by the first interface and the external suspect device;
   a second interface for connecting to the analysis unit, the second interface being a high-speed interface comprising SATA, USB, 1394, or Ethernet and configured to transfer the data at a second data transfer rate, the second data transfer rate being limited by the second interface, the analysis unit, and the first data transfer rate; and
   a processing unit comprising:
      memory for storing instructions, firmware, or parameters received from the analysis unit via the second interface; and
      a microprocessor and/or field programmable gate array (FPGA) for analyzing the data according to the instructions, firmware, or parameters,
   wherein the microprocessor and/or FPGA is configured to:
      read the data from the external suspect device via the first interface at the first data transfer rate;
      concurrently:
         perform computer forensic analysis on the data, comprising searching, compressing, decompressing, or hashing the data, in accordance with the instructions, firmware, or parameters; and
         transmit the data to the analysis unit via the second interface at the second data transfer rate; and
      transmit results of the computer forensic analysis to the analysis unit,
   wherein the first data transfer rate and the second data transfer rate are not limited by the processing unit, and
   wherein the microprocessor and/or FPGA is further configured to analyze the data concurrently and without slowing the first data transfer rate or the second data transfer rate while the data passes through the hardware accelerator.

2. The hardware accelerator of claim 1, wherein the second interface has one port to be used for sending instructions, getting results, and transferring data between the hardware accelerator and the analysis unit.

3. The hardware accelerator of claim 1, wherein the second interface has
- a first port to be used for sending instructions and getting results, and
- a second port for transferring data between the hardware accelerator and the analysis unit.

4. The hardware accelerator of claim 1, wherein the processing unit includes the FPGA for performing the described processing unit functions.

5. The hardware accelerator of claim 1, wherein the processing unit includes the microprocessor for performing the described processing unit functions.

6. The hardware accelerator of claim 1, wherein the microprocessor and/or FPGA is further configured to
- receive the instructions or parameters from the analysis unit via the second interface, and
- perform the computer forensic analysis based on the instructions or parameters.

7. The hardware accelerator of claim 1, further comprising a drive write protect module for preventing accidental write to the suspect device.

8. The hardware accelerator of claim 1, wherein the analysis unit includes a data storage device for storing the data from the suspect device transmitted by the hardware accelerator.

9. The hardware accelerator of claim 1 wherein the hardware accelerator is a computer forensic hardware accelerator.

10. A system adapted to analyze data on an external suspect computer device, the system comprising:
- a processing device adapted to analyze data obtained from the external suspect computer device; and
- a hardware accelerator connected to the processing device, the hardware accelerator comprising:
  - a second interface for connecting to the processing device, the second interface being a high-speed interface comprising SATA, USB, 1394, or Ethernet and configured to transfer the data at a second data transfer rate, the second data transfer rate being limited by the second interface and the processing device;
  - a first interface for connecting to the external suspect computer device, the first interface being configured to transfer the data at a first data transfer rate, the first data transfer rate being limited by the first interface and the external suspect computer device; and
  - a processing unit comprising:
    - memory for storing instructions, firmware, or parameters received from the processing device via the second interface; and
    - a microprocessor and/or field programmable gate array (FPGA) for analyzing the data according to the instructions, firmware, or parameters,
  - wherein the microprocessor and/or FPGA is adapted to:
    - read the data from the external suspect device via the first interface at the first data transfer rate;
    - concurrently:
      - perform computer forensic analysis on the data, comprising searching, compressing, decompressing, or hashing the data, in accordance with the instructions, firmware, or parameters; and
      - transmit the data to the processing device via the second interface at the second data transfer rate, the second data transfer rate being further limited by the first data transfer rate; and
    - transmit results of the computer forensic analysis to the processing device,
  - wherein the first data transfer rate and the second data transfer rate are not limited by the processing unit, and
  - wherein the microprocessor and/or FPGA is further adapted to analyze the data concurrently and without slowing the first data transfer rate or the second data transfer rate while the data passes through the hardware accelerator.

11. The system of claim 10, wherein the processing unit includes the field programmable gate array for performing the described processing unit functions.

12. The system of claim 10, wherein the processing unit includes the microprocessor for performing the described processing unit functions.

13. The system of claim 10, wherein the microprocessor and/or FPGA is further adapted to
- receive the instructions from the processing device, and
- perform the computer forensic analysis based on the instructions.

14. The system of claim 10, wherein the hardware accelerator further includes a drive write protect module for preventing accidental write to the suspect device.

15. The system of claim 10, wherein the processing device and the hardware accelerator are integrated in a single housing.

16. The system of claim 10, wherein the processing device includes a data storage device for storing the data from the suspect computer device transmitted by the hardware accelerator.

17. A method for forensically analyzing data on a suspect computer device, comprising:
- connecting a hardware accelerator to a processing device via a second interface and to the suspect computer device via a first interface, the hardware accelerator being external to the suspect computer device and including a processing unit comprising memory and a microprocessor and/or field programmable gate array (FPGA), the memory being configured to store instructions, firmware, or parameters received from the processing device via the second interface, the microprocessor and/or FPGA being configured to analyze the data according to the instructions, firmware, or parameters, the first interface being configured to transfer the data at a first data transfer rate, the first data transfer rate being limited by the first interface and the suspect computer device, the second interface being a high-speed interface comprising SATA, USB, 1394, or Ethernet and configured to transfer the data at a second data transfer rate, the second data transfer rate being limited by the second interface, the processing device, and the first data transfer rate;
- reading the data from the suspect computer device into the hardware accelerator via the first interface at the first data transfer rate;
- concurrently:
  - forensically analyzing the data by the hardware accelerator, comprising searching, compressing, decompressing, or hashing the data, in accordance with the instructions, firmware, or parameters; and
  - transmitting the data from the hardware accelerator to the processing device via the second interface at the second data transfer rate; and
- transmitting results of the forensic analysis from the hardware accelerator to the processing device,
- wherein the first data transfer rate and the second data transfer rate are not limited by the processing unit, and wherein the forensically analyzing the data takes place concurrently and without slowing the first data transfer rate or the second data transfer rate while the data passes through the hardware accelerator.

18. The method of claim 17, further comprising transmitting the instructions from the processing device to the hardware accelerator, wherein the forensically analyzing the data by the hardware accelerator comprises forensically analyzing the data based on the instructions.

19. The method of claim 17, further comprising storing the data from the suspect computer device in the processing device or in a data storage device connected to the processing device.

20. A method for forensically analyzing data on a suspect computer device, comprising:
- connecting a computer forensic hardware accelerator to an analysis device via a second interface, the computer forensic hardware accelerator including a processing unit comprising memory and a microprocessor and/or field programmable gate array (FPGA), the memory being configured to store instructions, firmware, or parameters received from the analysis device via the second interface, the microprocessor and/or FPGA being configured to analyze the data according to the instructions, firmware, or parameters, the second interface being a high-speed interface comprising SATA, USB, 1394, or Ethernet and configured to transfer the data at a second data transfer rate, the second data transfer rate being limited by the second interface and the analysis device;
- connecting the computer forensic hardware accelerator to the suspect computer device via a first interface, the computer forensic hardware accelerator being external to the suspect computer device, the first interface being configured to transfer the data at a first data transfer rate, the first data transfer rate being limited by the first interface and the suspect computer device;
- programming search, compression, decompression, or hash parameters or instructions into the computer forensic hardware accelerator or sending the search, compression, decompression, or hash parameters or instructions to the computer forensic hardware accelerator via the second interface;
- reading the data from the suspect computer device into the computer forensic hardware accelerator via the first interface at the first data transfer rate;
- concurrently:
  - forensically analyzing the data by the computer forensic hardware accelerator, comprising searching, compressing, decompressing, or hashing the data using the search, compression, decompression, or hash parameters or instructions; and
  - transmitting the data from the computer forensic hardware accelerator to the analysis device via the second interface at the second data transfer rate, the second data transfer rate being further limited by the first data transfer rate; and
- transmitting the results of the forensic analysis from the computer forensic hardware accelerator to the analysis device,
- wherein the first data transfer rate and the second data transfer rate are not limited by the processing unit, and
- wherein the forensically analyzing the data takes place concurrently and without slowing the first data transfer rate or the second data transfer rate while the data passes through the hardware accelerator.

21. The method of claim 20, further comprising transmitting the instructions from the analysis device to the computer forensic hardware accelerator, wherein the forensically analyzing the data by the computer forensic hardware accelerator comprises forensically analyzing the data based on the instructions.

22. The method of claim 20, further comprising storing the data from the suspect computer device in the analysis device or in a data storage device connected to the analysis device.

23. A method for analyzing data on a multiplicity of suspect computer devices using a respective multiplicity of hardware accelerators, comprising:
- connecting each hardware accelerator of the multiplicity of hardware accelerators to a respective suspect computer device of the multiplicity of suspect computer devices via a respective first interface, each hardware accelerator being external to the respective suspect computer device, each first interface being configured to transfer the data at a respective first data transfer rate, each first data transfer rate being limited by the respective first interface and the respective suspect computer device;
- connecting the multiplicity of hardware accelerators together with a high speed data transfer mechanism comprising SATA, USB, 1394, or Ethernet via a respective multiplicity of second interfaces, each hardware accelerator including a processing unit comprising memory and a microprocessor and/or field programmable gate array (FPGA), the memory being configured to store instructions, firmware, or parameters received from an analysis device via a respective second interface of the multiplicity of second interfaces, the microprocessor and/or FPGA being configured to store the data according to the instructions, firmware, or parameters, each second interface of the multiplicity of second interfaces being configured to transfer the data at a respective second data transfer rate, each second data transfer rate being limited by the respective second interface, the high speed data transfer mechanism, the analysis device, and the respective first data transfer rate; and
- connecting the analysis device to the high speed data transfer mechanism,
- wherein each hardware accelerator is configured to:
  - read the data from the respective suspect computer device via the respective first interface at the respective first data transfer rate;
  - concurrently:
    - perform computer forensic analysis on the data, comprising searching, compressing, decompressing, or hashing the data, in accordance with the instructions, firmware, or parameters; and
    - transmit the data to the analysis device via the respective second interface at the respective second data transfer rate; and
  - transmit results of the respective computer forensic analysis to the analysis device,
  - wherein the respective first data transfer rate and the respective second data transfer rate are not limited by the processing unit, and
- wherein each hardware accelerator is further configured to analyze the data concurrently and without slowing the respective first data transfer rate or the respective second data transfer rate while reading the data from the respective suspect computer device.

24. A method for analyzing data on a multiplicity of suspect computer devices using a respective multiplicity of hardware accelerators, comprising:

connecting each hardware accelerator of the multiplicity of hardware accelerators to a respective suspect computer device of the multiplicity of suspect computer devices via a respective first interface, each hardware accelerator being external to the respective suspect computer device, each first interface being configured to transfer the data at a respective first data transfer rate, each first data transfer rate being limited by the respective first interface and the respective suspect computer device;

connecting the multiplicity of hardware accelerators together with a high speed data transfer mechanism comprising SATA, USB, 1394, or Ethernet via a respective multiplicity of second interfaces, each hardware accelerator including a processing unit comprising memory and a microprocessor and/or field programmable gate array (FPGA), the memory being configured to store instructions, firmware, or parameters received from one of a multiplicity of analysis devices via a respective second interface of the multiplicity of second interfaces, the microprocessor and/or FPGA being configured to analyze the data according to the instructions, firmware, or parameters, each second interface of the multiplicity of second interfaces being configured to transfer the data at a respective second data transfer rate, each second data transfer rate being limited by the respective second interface, the high speed data transfer mechanism, the one of the multiplicity of analysis devices, and the respective first data transfer rate; and connecting the multiplicity of analysis devices to the high speed data transfer mechanism, wherein each hardware accelerator is configured to:
read the data from the respective suspect computer device via the respective first interface at the respective first data transfer rate;
concurrently:
perform computer forensic analysis on the data, comprising searching, compressing, decompressing, or hashing the data, in accordance with the instructions, firmware, or parameters; and
transmit the data to the one of the multiplicity of analysis devices via the respective second interface at the respective second data transfer rate; and
transmit results of the respective computer forensic analysis to the one of the multiplicity of analysis devices,
wherein the respective first data transfer rate and the respective second data transfer rate are not limited by the processing unit, and
wherein each hardware accelerator is further configured to analyze the data concurrently and without slowing the respective first data transfer rate or the respective second data transfer rate while reading the data from the respective suspect computer device.

25. The hardware accelerator of claim 1, wherein the microprocessor and/or FPGA comprises dedicated hardware and firmware programmed and optimized for specific search along with data hashing, compression/decompression, and analysis algorithms optimized for computer forensic investigation.

26. A hardware accelerator for use with an analysis unit to analyze suspect data from the analysis unit, comprising:
a high-speed interface for connecting to the analysis unit, the high-speed interface comprising SATA, USB, 1394, or Ethernet and configured to transfer the suspect data at a data transfer rate, the data transfer rate being limited by the high-speed interface and the analysis unit; and
a processing unit comprising:
memory for storing instructions, firmware, or parameters received from the analysis unit via the high-speed interface; and
a microprocessor and/or field programmable gate array (FPGA) for analyzing the suspect data according to the instructions, firmware, or parameters,
wherein the microprocessor and/or FPGA is configured to:
concurrently:
read the suspect data from the analysis unit via the high-speed interface at the data transfer rate; and
perform computer forensic analysis on the suspect data, comprising searching, compressing, decompressing, or hashing the suspect data, in accordance with the instructions, firmware, or parameters; and
transmit results of the computer forensic analysis to the analysis unit via the high-speed interface at the data transfer rate,
wherein the data transfer rate is not limited by the processing unit, and
wherein the microprocessor and/or FPGA is further configured to analyze the suspect data concurrently and without slowing the data transfer rate while reading the suspect data from and transmitting the results of the computer forensic analysis to the analysis unit.

27. A hardware accelerator for use with a multiplicity of analysis units to analyze suspect data from the multiplicity of analysis units, the hardware accelerator comprising:
an interface for connecting to a high speed data transfer mechanism comprising SATA, USB, 1394, or Ethernet, the multiplicity of analysis units being connected to the high speed data transfer mechanism, the interface being configured to transfer the suspect data at a data transfer rate, the data transfer rate being limited by the interface and one or more of the multiplicity of analysis units; and
a processing unit comprising:
memory for storing instructions, firmware, or parameters received from the one or more of the multiplicity of analysis units via the interface; and
a microprocessor and/or field programmable gate array (FPGA) for analyzing the suspect data according to the instructions, firmware, or parameters,
wherein the microprocessor and/or FPGA is configured to:
concurrently:
read the suspect data from the one or more of the multiplicity of analysis units via the interface at the data transfer rate; and
perform computer forensic analysis on the suspect data, comprising searching, compressing, decompressing, or hashing the suspect data, in accordance with the instructions, firmware, or parameters; and
transmit results of the computer forensic analysis to the one or more of the multiplicity of analysis units via the interface at the data transfer rate,
wherein the data transfer rate is not limited by the processing unit, and
wherein the microprocessor and/or FPGA is further configured to analyze the suspect data concurrently and without slowing the data transfer rate while reading the suspect data from and transmitting the results of the computer forensic analysis to the one or more of the multiplicity of analysis units.

28. A multiplicity of hardware accelerators for use with an analysis unit to analyze suspect data from the analysis unit, each hardware accelerator of the multiplicity of hardware accelerators comprising:

an interface for connecting to a high speed data transfer mechanism comprising SATA, USB, 1394, or Ethernet, the analysis unit being connected to the high speed data transfer mechanism, the interface being configured to transfer the suspect data at a respective data transfer rate, the respective data transfer rate being limited by the interface and the analysis unit; and a processing unit comprising:

memory for storing instructions, firmware, or parameters received from the analysis unit via the interface; and a microprocessor and/or field programmable gate array (FPGA) for analyzing the suspect data according to the instructions, firmware, or parameters, wherein the microprocessor and/or FPGA is configured to:
concurrently:
read the suspect data from the analysis unit via the interface at the respective data transfer rate; and
perform computer forensic analysis on the suspect data, comprising searching, compressing, decompressing, or hashing the suspect data, in accordance with the instructions, firmware, or parameters; and
transmit results of the computer forensic analysis to the analysis unit via the interface at the respective data transfer rate, wherein the respective data transfer rate is not limited by the processing unit, and wherein the microprocessor and/or FPGA is further configured to analyze the suspect data concurrently and without slowing the respective data transfer rate while reading the suspect data from and transmitting the results of the computer forensic analysis to the analysis unit.

29. A hardware accelerator for use with an analysis unit to analyze data on an external computer or computer device, the hardware accelerator comprising:

a first interface for connecting to the external computer or computer device, the first interface being configured to transfer the data at a first data transfer rate, the first data transfer rate being limited by the first interface and the external computer or computer device;

a second interface for connecting to the analysis unit, the second interface being a high-speed interface comprising SATA, USB, 1394, or Ethernet and configured to transfer the data at a second data transfer rate, the second data transfer rate being limited by the second interface, the analysis unit, and the first data transfer rate; and a processing unit comprising:

memory for storing instructions, firmware, or parameters received from the analysis unit via the second interface; and a microprocessor and/or field programmable gate array (FPGA) for pre-processing and analyzing the data according to the instructions, firmware, or parameters, wherein the microprocessor and/or FPGA is configured to:
read the data from the external computer or computer device via the first interface at the first data transfer rate;
pre-process the data, comprising one of searching, compressing, decompressing, or hashing the data, in accordance with the instructions, firmware, or parameters;
concurrently:
perform analysis on the data in addition to pre-processing the data, comprising another one of searching, compressing, decompressing, or hashing the data, in accordance with the instructions, firmware, or parameters; and
transmit the data to the analysis unit via the second interface at the second data transfer rate; and
transmit results of the analysis to the analysis unit,
wherein the first data transfer rate and the second data transfer rate are not limited by the processing unit, and
wherein the microprocessor and/or FPGA is further configured to analyze the data concurrently and without slowing the first data transfer rate or the second data transfer rate while the data passes through the hardware accelerator.

30. The hardware accelerator of claim 29, wherein the pre-processing the data comprises compressing or decompressing the data.

31. The hardware accelerator of claim 29, wherein the pre-processing the data comprises hashing the data.

32. The hardware accelerator of claim 29, wherein the pre-processing the data comprises searching the data.

33. A system adapted to analyze data on an external computer device, the system comprising:

a processing device adapted to analyze data obtained from the external computer device;

a hardware accelerator connected to the processing device, the hardware accelerator comprising:

a second interface for connecting to the processing device, the second interface being a high-speed interface comprising SATA, USB, 1394, or Ethernet and configured to transfer the data at a second data transfer rate, the second data transfer rate being limited by the second interface and the processing device;

a first interface for connecting to the external computer device, the first interface being configured to transfer the data at a first data transfer rate, the first data transfer rate being limited by the first interface and the external computer device; and a processing unit comprising:

memory for storing instructions, firmware, or parameters received from the processing device via the second interface; and a microprocessor and/or field programmable gate array (FPGA) for pre-processing and analyzing the data according to the instructions, firmware, or parameters, wherein the microprocessor and/or FPGA is adapted to:
read the data from the external computer device via the first interface at the first data transfer rate;
pre-process the data, comprising one of searching, compressing, decompressing, or hashing the data, in accordance with the instructions, firmware, or parameters;
concurrently:
perform analysis on the data in addition to pre-processing the data, comprising another one of searching, compressing, decompressing, or hashing the data, in accordance with the instructions, firmware, or parameters; and
transmit the data to the processing device via the second interface at the second data transfer rate, the second data transfer rate being further limited by the first data transfer rate; and
transmit results of the analysis to the processing device,
wherein the first data transfer rate and the second data transfer rate are not limited by the processing unit, and wherein the microprocessor and/or FPGA is further adapted to analyze the data concurrently and without slowing first data transfer rate or the second data transfer rate while the data passes through the hardware accelerator.

34. The system of claim 33, wherein the pre-processing the data comprises compressing or decompressing the data.

35. The system of claim 33, wherein the pre-processing the data comprises hashing the data.

36. The system of claim 33, wherein the pre-processing the data comprises searching the data.

37. A method for analyzing data on a computer device, comprising:

connecting a hardware accelerator to a processing device via a second interface and to the computer device via a first interface, the hardware accelerator being external to the computer device and including a processing unit comprising memory and a microprocessor and/or field programmable gate array (FPGA), the memory being configured to store instructions, firmware, or parameters received from the processing device via the second interface, the microprocessor and/or FPGA being configured to pre-process and analyze the data according to the instructions, firmware, or parameters, the first interface being configured to transfer the data at a first data transfer rate, the first data transfer rate being limited by the first interface and the computer device, the second interface being a high-speed interface comprising SATA, USB, 1394, or Ethernet and configured to transfer the data at a second data transfer rate, the second data transfer rate being limited by the second interface, the processing device, and the first data transfer rate;

reading the data from the computer device into the hardware accelerator via the first interface at the first data transfer rate;

pre-processing the data, comprising one of searching, compressing, decompressing, or hashing the data, in accordance with the instructions, firmware, or parameters;

concurrently:

analyzing the data by the hardware accelerator in addition to pre-processing the data, comprising another one of searching, compressing, decompressing, or hashing the data, in accordance with the instructions, firmware, or parameters; and transmitting the data from the hardware accelerator to the processing device at the second data transfer rate; and transmitting results of the analysis from the hardware accelerator to the processing device, wherein the first data transfer rate and the second data transfer rate are not limited by the processing unit, and wherein the analyzing the data takes place concurrently and without slowing the first data transfer rate or the second data transfer rate while the data passes through the hardware accelerator.

38. The method of claim 37, wherein the pre-processing the data comprises compressing or decompressing the data.

39. The method of claim 37, wherein the pre-processing the data comprises hashing the data.

40. The method of claim 37, wherein the pre-processing the data comprises searching the data.

* * * * *